Jan. 10, 1956   L. C. KEMP, JR   2,730,438
PROCESS FOR TRANSPORTING ACETYLENE
Filed Dec. 14, 1950   2 Sheets-Sheet 1
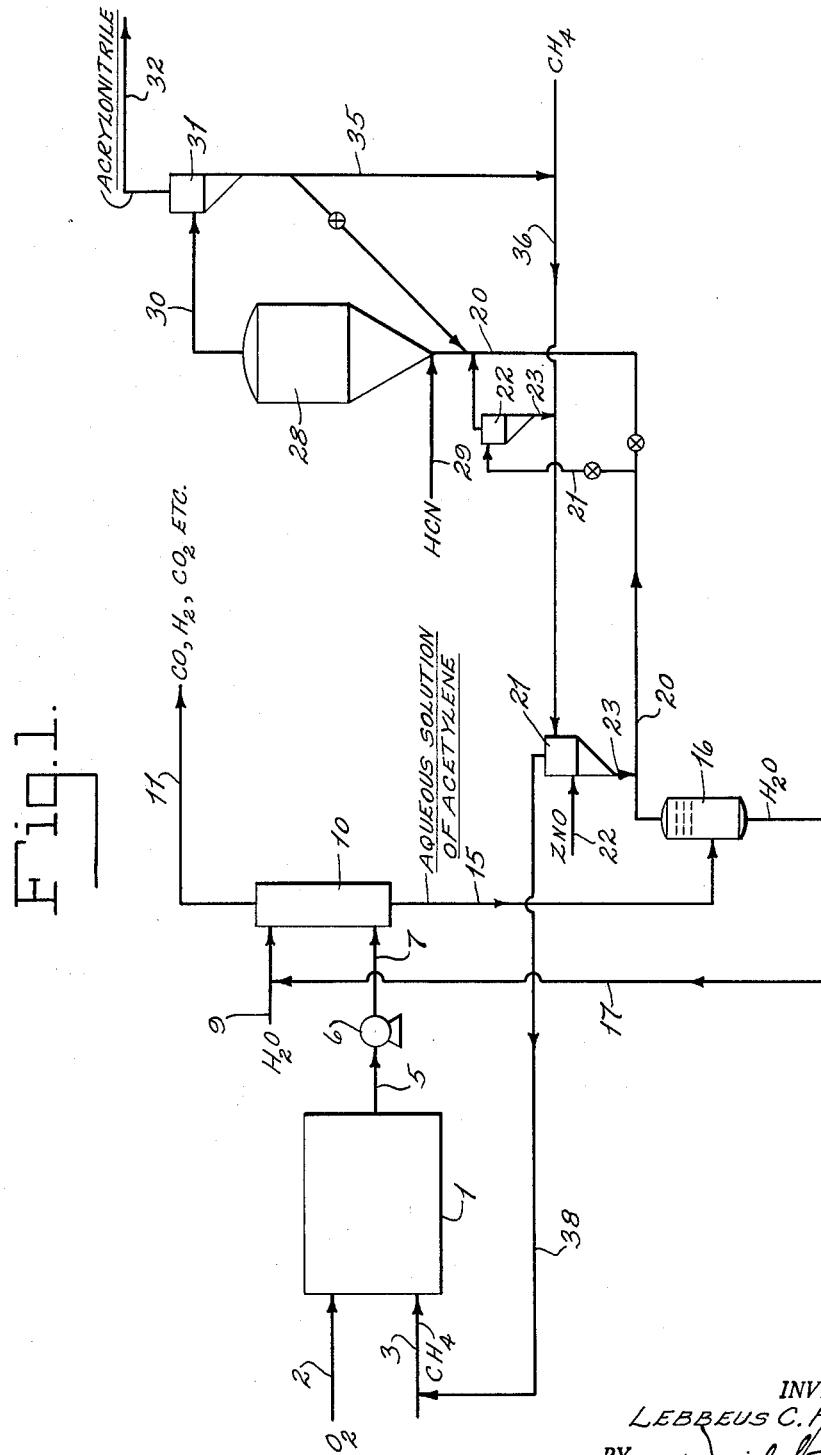
INVENTOR.
LEBBEUS C. KEMP, JR.
BY
ATTORNEYS

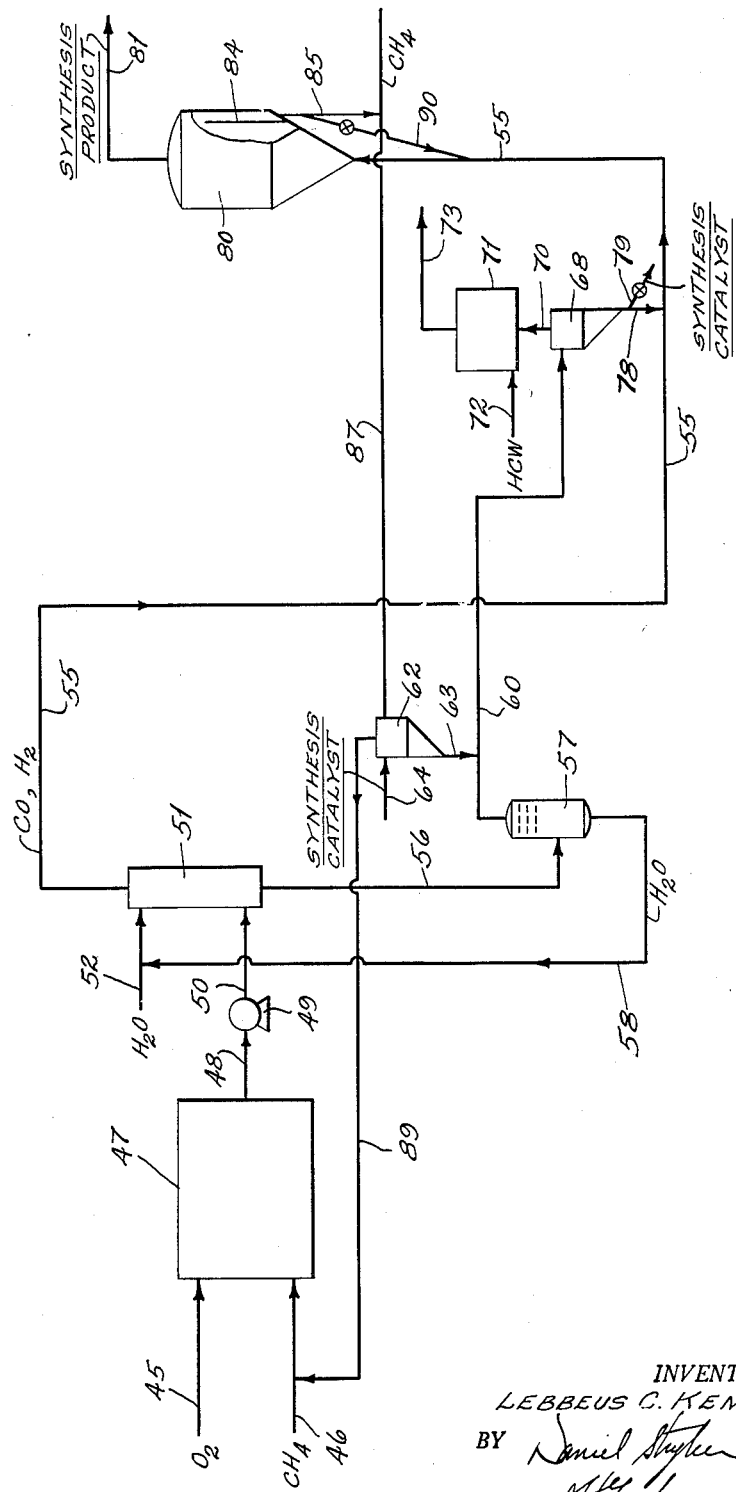

2,730,438

PROCESS FOR TRANSPORTING ACETYLENE

Lebbeus C. Kemp, Jr., Scarsdale, N. Y., assignor to The Texas Company, New York, N. Y., a corporation of Delaware Application December 14, 1950, Serial No. 200,727

9 Claims. (Cl. 48—190)

This invention relates to a novel process for transporting acetylene. More specifically, this invention provides a safe process for transporting acetylene which is particularly adapted to transfer of gaseous acetylene under pressure from one locale to another in an integrated plant.

Acetylene chemistry has received a great impetus from Reppe's work on the high pressure reactions of acetylene. The development of acrylonitrile polymers as synthetic fibres, e. g. Orlon and Vynyon N, spurred interest in acetylene chemistry and there are several plants under construction to produce acrylonitrile by reaction of acetylene with hydrogen cyanide. The intense interest in acetylene chemistry has instigated substantial research to discover means which will reduce the risk in handling of acetylene under pressure. The process of the subject invention produces a novel method for handling the movement of acetylene from its point of manufacture to the locale where it is subjected to further reaction.

Up to the present time two general methods have been practised to minimize the danger of explosive decomposition of acetylene under pressure. One method involves diluting acetylene with a gaseous diluent such as nitrogen, carbon dioxide or methane; the other method involves keeping acetylene molecules in transit within a certain maximum distance of a wall surface, by limiting the amount of free space in the conduits to a minimum. This latter procedure involves the use of small bore lines for carrying acetylene feeds and by subdividing all large voids into smaller spaces by filling them with bundles of small tubes less than 0.5 inch in diameter, or by packing them with steel or porcelain Raschig rings. The second procedure is usually employed in continuous operations since the first process has the drawback that low partial pressures of acetylene are realized therewith. The process of the subject application eliminates the necessity of using conduits which are packed with small diameter tubes or with Raschig rings, and is very effective in preventing the danger of explosive decomposition of acetylene while preserving a high acetylene partial pressure.

In accordance with the process of this invention, acetylene is transported under pressure by suspending a particulate solid, which advantageously has a high co-efficient of heat conductivity in the acetylene stream, and passing the acetylene plus suspended particles through a conduit at a velocity sufficient to maintain a turbulent flow. At the locale of an acetylene conversion unit, the suspended particles are either removed from the acetylene stream prior to its contact with another reagent or the suspended particles are employed as the catalyst for the desired conversion. A methane stream from which acetylene is manufactured may be used to return separated particles to the site of the acetylene manufacturing plant. If the suspended solid is employed as a catalyst for the conversion of acetylene, the particles may be removed from the acetylene conversion zone and returned to the locale of the acetylene manufacturing unit with or without a regeneration treatment.

The process of the subject application is particularly adapted for use in an integrated plant containing both acetylene manufacturing and acetylene conversion units because return of the solid to the manufacturing unit is readily effected. The process is ordinarily not used to transport acetylene over long distances because of the difficulties entailed in returning the suspended particulate solid to the point of acetylene manufacture. The process of the invention, however, is used for long distance transportation of acetylene in conjunction with the transportation of a particulate solid from one locale to another. If it is desirable to transport both acetylene and a particulate solid between widely separated points, the process of this invention will be commercially attractive for long haul acetylene transport.

Localized overheating is eliminated and a substantially uniform temperature is maintained throughout the entire volume of acetylene gas being transported by the presence of suspended particles in the transfer conduits. The suspended particles dissipate heat generated by localized decomposition of individual acetylene molecules to the outer wall of the conduit and prevents the build-up of hot spots from which detonation of the acetylene results. Because of the excellent heat exchange effected between the wall surfaces and the suspended particles, the process of this invention is more effective in preventing explosions of pressurized acetylene in transit than are the previously described expedients of the prior art. The subject invention provides a novel and unusual adaptation of the fluidized technique and represents an important stride in the commercial development of acetylene chemistry by its elimination of a great measure of the risk involved in the use of acetylene.

In the process of this invention the average particle size of the particulate solid is in the range of 10 to 800 microns and usually is between 30 to 300 microns. Metal and metalloid oxides and sulfides such as silica, chromia, alumina, molybdenum sulfide, etc. or metals such as powdered iron, aluminum, chromium, nickel, and cobalt may be used. It is advisable to employ the most conductive material which is consonant with the intended use of the particulate solid. Thus, for example, if there is no use contemplated for the fluidized particulate solid other than as an acetylene transporting agent, powdered metals such as iron or aluminum which possess high conductivity are employed. In connection with the use of powdered metals as the transporting medium, there should be avoided the use of metals such as copper and silver which form explosive acetylides with acetylene.

The process of the invention may be employed with all methods of acetylene manufacture. The three main methods presently employed for acetylene manufacture are: (1) the reaction of water with calcium carbide; (2) the electric arc treatment of methane; and (3) the thermal decomposition of methane wherein the heat is supplied by partial combustion. The electric arc process and the thermal decomposition of methane both result in the formation of a product containing 5 to 20 per cent acetylene; acetylene is recovered therefrom in high concentration by pressure absorption in solvents such as water, furane derivatives and dimethoxy tetraethylene glycol. The particulate solid is advantageously suspended in pressurized acetylene after its recovery from absorption solvent by flashing. In the case of acetylene manufacture by the reaction of calcium carbide with water, it is advisable to effect this reaction under pressure to minimize the difficulties attending compression of pure acetylene.

The acetylene is passed through a conduit connecting the acetylene manufacturing plant and the conversion unit at a linear velocity higher than 1 foot per second. When the acetylene is passed through a conduit at a velocity substantially below the prescribed minimum, there is a tendency for the suspended particles to deposit in the lower portion of the conduit. At linear velocities greater than 1 foot per second there is substantially no tendency for particles of the prescribed particle size of 10 to 800 microns to deposit in the lower portion of the conduit. Ordinarily linear velocities between 2 and 10 feet per second are employed in order to prevent deposit of particulate solid in the conduit. It will be understood that the density and particle size of the suspended particulate solid will be major factors in determining the linear velocity to be employed.

As indicated previously, there are possible two modifications of the subject invention. In the first modification the suspended particles are separated from the acetylene just prior to its contact with the reagent with which it reacts in the conversion unit. In this modification it is recommended that the suspended particles either have a beneficial effect on the desired conversion or are neutral thereto since there is a possibility that some of the particle fines will be carried through into the acetylene conversion unit. In this modification it is possible to employ the suspended particles for another use or it is possible to use the suspended particles solely for acetylene transport.

In the modification involving separation of the suspended particles from acetylene prior to its conversion, the separated particles may be returned to the acetylene manufacturing unit by means of a methane stream. When acetylene is manufactured therefrom by the electric arc process or by thermal decomposition, the methane supply line can act as the means for returning the particulate solid to the acetylene generator in a fluidized state.

The particles may also be employed as a catalyst in a separate conversion process; in this modification the particles are returned to the acetylene generator after their utilization in the separate conversion process. An illustration of this modification of the invention will be described in detail later and is exemplified by a plant wherein acetylene is manufactured by thermal decomposition of methane and the by-product carbon monoxide and hydrogen are utilized in the production of synthetic gasoline or in hydrogen manufacture. In such an operation the catalyst to be employed in the utilization of the carbon monoxide and hydrogen by-products serves as the acetylene transportation medium and may be returned to the site of the acetylene generator after it has been separated from the acetylene stream and utilized in the carbon monoxide and hydrogen conversion.

The second modification involves the use of an acetylene transportation medium which may be directly utilized in the conversion to which the acetylene is to be subjected. This modification is well adapted to the use of fluidized catalyst for the acetylene conversion so that particulate solid may be continuously removed from the acetylene conversion unit and returned to the acetylene generator. This type of operation is illustrated by the use of powdered zinc oxide both as the transportation medium and as the catalyst for the production of acrylonitrile by reaction of acetylene with hydrogen cyanide; on separation of the bi-functional powdered solid from the acetylene conversion zone it is returned to the acetylene generator suspended in the methane from which acetylene is manufactured.

Separation of the suspended particulate solid from the acetylene stream prior to its conversion or from the acetylene conversion products is effected by conventional means. Cyclone separators are normally employed, but other conventional separation procedures are also used. When the solid particles act as both acetylene transport medium and acetylene conversion catalyst, settling zones may be used in the acetylene conversion units to separate out the solid particles.

In the accompanying drawings the two modifications of the process of the subject invention are illustrated in diagrammatic form.

Figure 1 illustrates the utilization of an acetylene conversion catalyst as the transportation medium, whereas Figure 2 illustrates the modification involving separation of the transportation medium from the acetylene prior to its conversion.

In Figure 1, oxygen and methane are introduced into a reaction zone 1 through pipes 2 and 3 respectively. Methane and oxygen are reacted at a temperature of about 2600° F. and approximately atmospheric pressure at a very short contact time in the order of 0.02 second whereby there is produced a reaction product comprising approximately 7 to 10 per cent acetylene, 25 per cent carbon monoxide, 55 per cent hydrogen, 4 per cent carbon dioxide and 4 per cent non-converted methane. The reaction product issues from the reaction zone 1 through a pipe 5 and is introduced into a compressor 6 wherein it is raised to a pressure of approximately 200 to 300 pounds per square inch. The reaction product at a pressure of 200 to 300 pounds per square inch is introduced through a pipe 7 into a countercurrent absorption tower 10 wherein it is contacted with a countercurrent stream of water introduced therein through a pipe 9 whereby the acetylene portion of the reaction product is substantially dissolved in water. A gas stream, which comprises mainly carbon monoxide and hydrogen with minor quantities of carbon dioxide and methane, issues from the top of the absorption tower 10 through a pipe 11.

An aqueous solution of acetylene is withdrawn from the lower portion of the absorption tower 10 through a pipe 15 and is introduced therethrough into a flash tower 16 wherein the acetylene is flashed from the aqueous solution. Water is removed from the bottom portion of the tower 16 through a pipe 17 and is recycled therethrough to the absorption tower 10 to contact further quantities of acetylene-containing gas.

Powdered zinc oxide of about 50 to 100 micron average particle size is introduced into the acetylene stream issuing from the upper portion of the flash tower 16 through a pipe 20. A combination hopper and cyclone separator 21 acts as the source of the zinc oxide which is introduced through a pipe 23 into the conduit 20 through which the acetylene is to be transported. A pipe 22 is the source of fresh zinc oxide. The acetylene is pumped through a conduit 20 at a linear velocity of about 5 feet per second whereby the zinc oxide is maintained in a suspended condition in the conduit 20.

Provision is made for adjusting the ratio of powder to acetylene to the optimum ratio for acetylene conversion to acrylonitrile. If the acetylene stream contains too high a concentration of powder for acetylene conversion, the acetylene stream is introduced through a pipe 21 into a separator 22 wherein part of the zinc oxide is removed from the acetylene stream; the separated zinc oxide is returned to the acetylene generator through pipe 23 and the methane supply line as will be described hereafter. If additional catalyst is required, it is supplied from the catalyst removed from the acetylene conversion unit; its supply will be described hereafter.

The acetylene stream containing suspended therein zinc oxide is introduced through the conduit 20 into a reaction zone 28 adapted for conversion of acetylene into acrylonitrile by reaction with hydrogen cyanide in the presence of the zinc oxide catalyst which is maintained in a suspended state during conversion of the reactants.

Hydrogen cyanide is introduced into the reaction zone 28 through a pipe 29. In the reaction zone 28 the temperature and pressure conditions are maintained at levels which are particularly suitable for acrylonitrile production. For example, temperatures of 660 to 932° F. and pressures of atmosphere to 2000 pounds per square inch gauge are recommended for this exothermic reaction.

The reaction product comprising acrylonitrile and unreacted acetylene and hydrogen cyanide is removed from the reaction zone 28 through a pipe 30 which passes into the gas-solid separator 31 which serves to separate the suspended zinc oxide from the acrylonitrile product stream. A gaseous stream comprising acrylonitrile, acetylene and hydrogen cyanide issues from the gas-solid separator 31 through a pipe 32. Acrylonitrile can be separated by condensation from the gaseous reactants which are thereafter recycled to the reaction zone. The recycled stream is not potentially explosive because of the very dilute concentration of acetylene therein.

The zinc oxide separated from the acrylonitrile stream in the gas-solid separator 31 falls through a standpipe 35 into a conduit 36 through which methane from which acetylene is manufactured by thermal decomposition is flowing. A portion of the separated zinc oxide can be removed from the standpipe 35 through a crossover pipe 38 to supply additional catalyst for the acrylonitrile reaction if the quantity of catalyst in the acetylene stream is less than the desired quantity for acetylene conversion; the crossover pipe 38 flows into the pipe 20 through which the acetylene stream is introduced into the reactor 28. The zinc oxide is returned suspended in the methane stream to the locale of the acetylene manufacture and at that point is separated from the methane in the previously mentioned separator-hopper 21. The methane from which the zinc oxide has been separated is recycled through a pipe 38 to the reaction zone wherein it is converted to acetylene by thermal decomposition.

The zinc oxide separated from the methane stream in the separator-hopper 21 is then introduced into acetylene flashed from the aqueous solution so as to produce a continuous cyclic operation. Provision may also be made for regeneration or other treatment of the zinc oxide catalyst prior to its introduction into the methane stream which transports it to the acetylene generator.

In Figure 2 there is illustrated the second modification of the invention wherein the acetylene transporting medium is separated from the acetylene prior to its conversion. In this figure the manufacture of acetylene is effected by the same procedure that is outlined in the description of Figure 1. Oxygen and methane are introduced through pipes 45 and 46 respectively into a synthesis reactor 47. The acetylene-containing reaction product is introduced through a pipe 48 into a compressor 49 where it is raised to a pressure of approximately 200 to 300 pounds per square inch. The compressed reaction product is introduced into an absorption tower 51 through a pipe 50 wherein water introduced therein through a pipe 52 absorbs acetylene from the reaction product. The non-absorbed components of the reaction product are removed from the tower 51 through a pipe 55; further utilization of this stream will be described hereafter.

The aqueous solution of acetylene is introduced through a pipe 56 into a flash tower 57 wherein the acetylene is flashed from the aqueous absorbent. The water solution from which acetylene has been flashed is recycled through a pipe 58 to the absorbent tower 51.

The acetylene is withdrawn from the flash tower 57 through a pipe 60 into which a finely divided catalyst of 50 to 100 microns adapted for the conversion of hydrogen and carbon monoxide into synthetic gasoline is immediately introduced. An iron catalyst comprising approximately 98 per cent iron, 1 to 2 per cent alumina and 0.1 to 0.5 per cent potassium oxide promoter serves well as an acetylene transport medium and as a catalyst for synthesis gas conversion into synthetic gasoline. Particles of an iron catalyst of the aforedescribed composition are introduced into the conduit 60 from a hopper-separator 62 through a standpipe 63. Fresh make-up catalysts can be introduced into the hopper-separator 62 through a pipe 64.

The acetylene is transported through the conduit 60 from the location of the acetylene generator to the location of the acetylene conversion unit for the production of acrylonitrile. At the locale of the acetylene conversion unit the conduit 60 connects with a gas-solid separator 68 wherein the particles of iron catalyst are separated from the acetylene stream. The acetylene is passed through the conduit 60 at a linear velocity of approximately 5 feet per second, at which speed the particles of hycosynthesis catalyst are maintained in the suspended state.

The acetylene separated from the transportation medium in the gas-solid separator 68 is immediately introduced through a pipe 70 into an acetylene conversion unit 71 into which hydrogen cyanide is introduced through a pipe 72. It is advisable that the pipe 70, which is of very short length, contain a bundle of tubes which are less than 0.5 centimeter apart so as to prevent acetylene detonation in the period between its separation from the transport medium and its reaction with hydrogen cyanide in the reactor 71. The temperature and pressure conditions maintained in the reactor 71 are not germane to this invention, but are particularly adapted for efficient conversion of acetylene and hydrogen cyanide into acrylonitrile. The product acrylonitrile is withdrawn from the reactor 71 through a pipe 73 and is separated from the non-converted reactants and other by-products by condensation.

The iron catalyst separated from the acetylene stream in the gas-solid separator 68 flows through a standpipe 78 into the conduit 55 through which the gaseous stream which is removed from the absorbent tower 51, and comprises mainly carbon monoxide and hydrogen in a 1 to 2 ratio, is flowing to a synthesis gas conversion unit. A standpipe 79 serves to remove iron catalyst so that the ratio of catalyst to synthesis gas may be lowered if desired. The particles of the iron catalyst are carried along in this synthesis gas stream to the synthesis reactor 80 wherein carbon monoxide and hydrogen are converted into liquid hydrocarbons. By way of example, the temperature and pressure conditions which are effective for conversion of synthesis gas into liquid hydrocarbons by contact with an iron catalyst of the composition heretofore specified are in the range of 550 to 750° F. and of 150 to 500 pounds per square inch. Since the synthesis gas produced as a by-product of synthesis manufacture has been compressed to a pressure of approximately 200 to 300 pounds per square inch in the absorption of acetylene from the product of acetylene generation, it is recommended that pressures within this range be employed for the synthesis gas conversion. The synthesis product is withdrawn from the reactor 80 through a pipe 81.

Since a fluidized catalyst reaction is effected in the reactor 80, it is possible to continuously withdraw catalyst from the reaction 80 by means of a settling zone 84 and a standpipe 85. A crossover pipe 90 may be employed to increase the ratio of catalyst to synthesis gas if desired; the pipe 90 flows into the pipe 55 through which synthesis gas and catalyst are introduced with the conversion zone 80. Particles of iron catalyst so separated can be returned to the hopper-separator 62 by means of a conduit 87 through which there flows the methane stream from which acetylene is manufactured. The catalyst particles are separated from the methane stream in the hopper-separator 62 and are reintroduced into the acetylene stream issuing from the flash tower 57. Provision can be made for regeneration on other treatment of the hycosynthesis catalyst prior to its return to the hopper-separator 62. The methane stream from which the particles of iron catalyst have been separated is recycled to the acetylene generator 47 through a pipe 89.

The foregoing descriptions illustrate two important modifications of the process of the subject application. It will be noted that in both of these modifications, acetylene transportation is readily effected with the elimination of explosion hazard and without the utilization of complex equipment. In addition, both of these modifications are characterized by several cooperative features which result in excellent utilization of the transportation medium and the by-products of acetylene generation.

While the invention has been illustrated in connection with the transportation of acetylene from a generator unit to a conversion plant producing acrylonitrile, it will be understood that the process is applicable in all utilizations of acetylene. Moreover, the process is applicable to acetylene generated by other methods of manufacture. The process may also be utilized in movement of acetylene from tank cars to the location of acetylene conversion units.

Obviously many modifications and variations of the invention as hereinafter set forth may be made without departing from the spirit and scope thereof, and therefore only such limitations should be imposed as are indicated in the appended claims.

I claim:

1. In the transportation of a stream of gas consisting of substantially pure acetylene under superatmospheric pressure from a first location to a second location remote from the first by fluid flow through a conduit, the improvement which comprises forming a suspension in said acetylene of particles of a heat conductive solid material substantially inert with respect to acetylene and having a particle size within the range of about 10 to 800 microns, and passing said suspension from said first location to said second location at a velocity sufficient to maintain said solid particles in suspension in said stream of acetylene.

2. A method of transporting acetylene as defined in claim 1 wherein the velocity of said stream is in excess of 1 foot per second.

3. A method according to claim 2 wherein said velocity is within the range of 2 to 10 feet per second.

4. A method according to claim 1 in which said particles of solid material are selected from the group consisting of metals inert to acetylene, metal oxides, metal sulfides and mixtures thereof.

5. A method as defined in claim 1 wherein said solid material is iron.

6. A method as defined in claim 1 wherein said solid material is zinc oxide.

7. A method as defined in claim 1 wherein said solid material is aluminum.

8. A method as defined in claim 1 wherein said solid material is alumina.

9. A method as defined in claim 1 wherein said solid material is silica.

References Cited in the file of this patent

UNITED STATES PATENTS

| | | |
|---|---|---|
| 2,034,750 | Deming | Mar. 24, 1936 |
| 2,345,487 | Liedholm | Mar. 28, 1944 |
| 2,405,395 | Bahlke et al. | Aug. 6, 1946 |
| 2,407,472 | Butterbaugh et al. | Sept. 10, 1946 |
| 2,425,267 | Schulze et al. | Aug. 5, 1947 |
| 2,451,804 | Campbell et al. | Oct. 19, 1948 |

FOREIGN PATENTS

| | | |
|---|---|---|
| 883,433 | France | Mar. 22, 1943 |

OTHER REFERENCES

Fiat Final Report 720, Office of Military Government for Germany, U. S., pp. 6-8, January 28, 1946.